March 11, 1952 — W. A. BRACKEN — 2,588,694
SUN VISOR FOR AUTOMOBILES
Filed Jan. 12, 1950 — 3 Sheets-Sheet 2
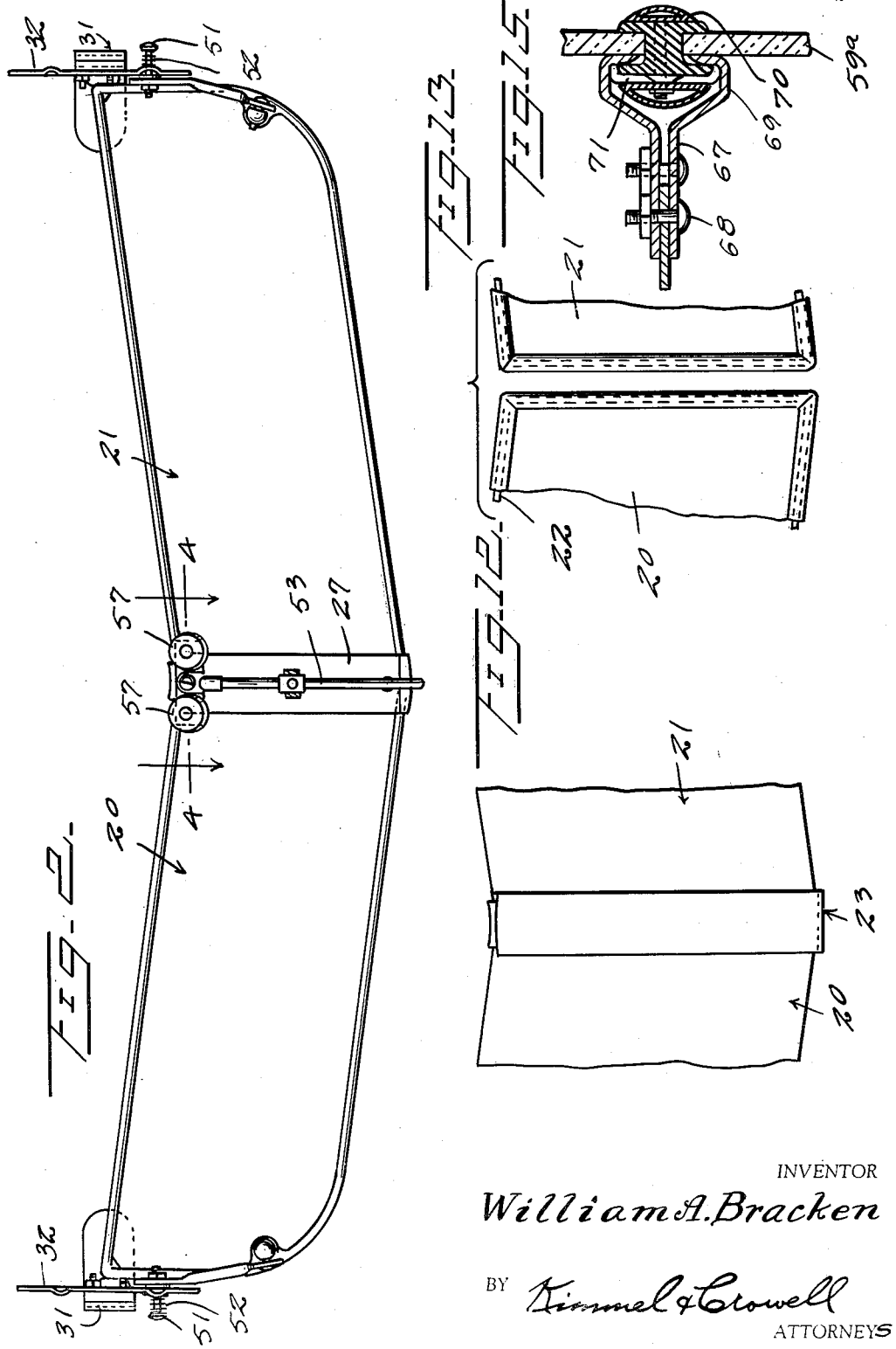
INVENTOR
William A. Bracken
BY Kimmel & Crowell
ATTORNEYS March 11, 1952 W. A. BRACKEN 2,588,694
SUN VISOR FOR AUTOMOBILES
Filed Jan. 12, 1950 3 Sheets-Sheet 3
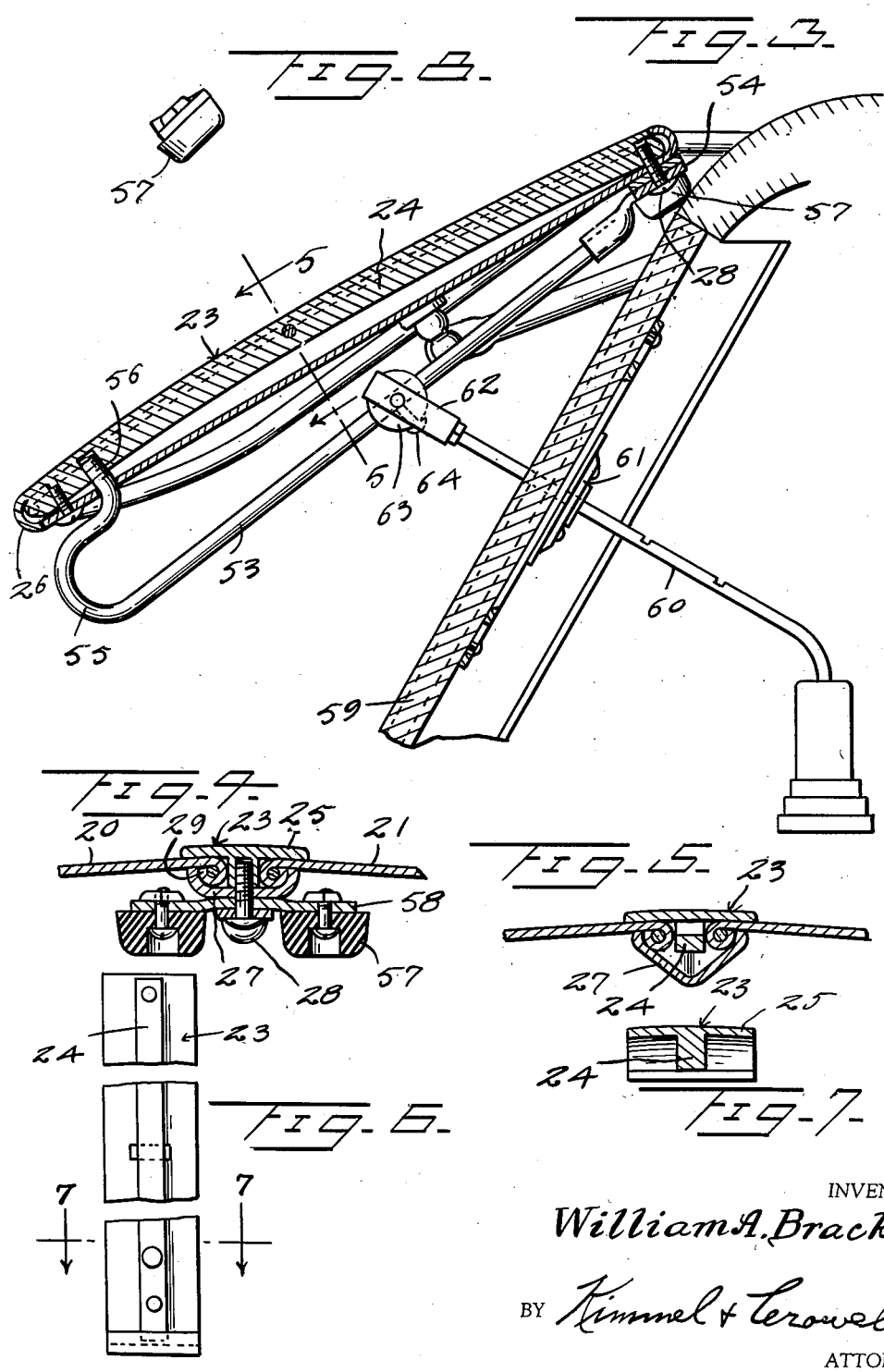
INVENTOR
William A. Bracken
BY Kimmel & Crowell
ATTORNEYS Patented Mar. 11, 1952

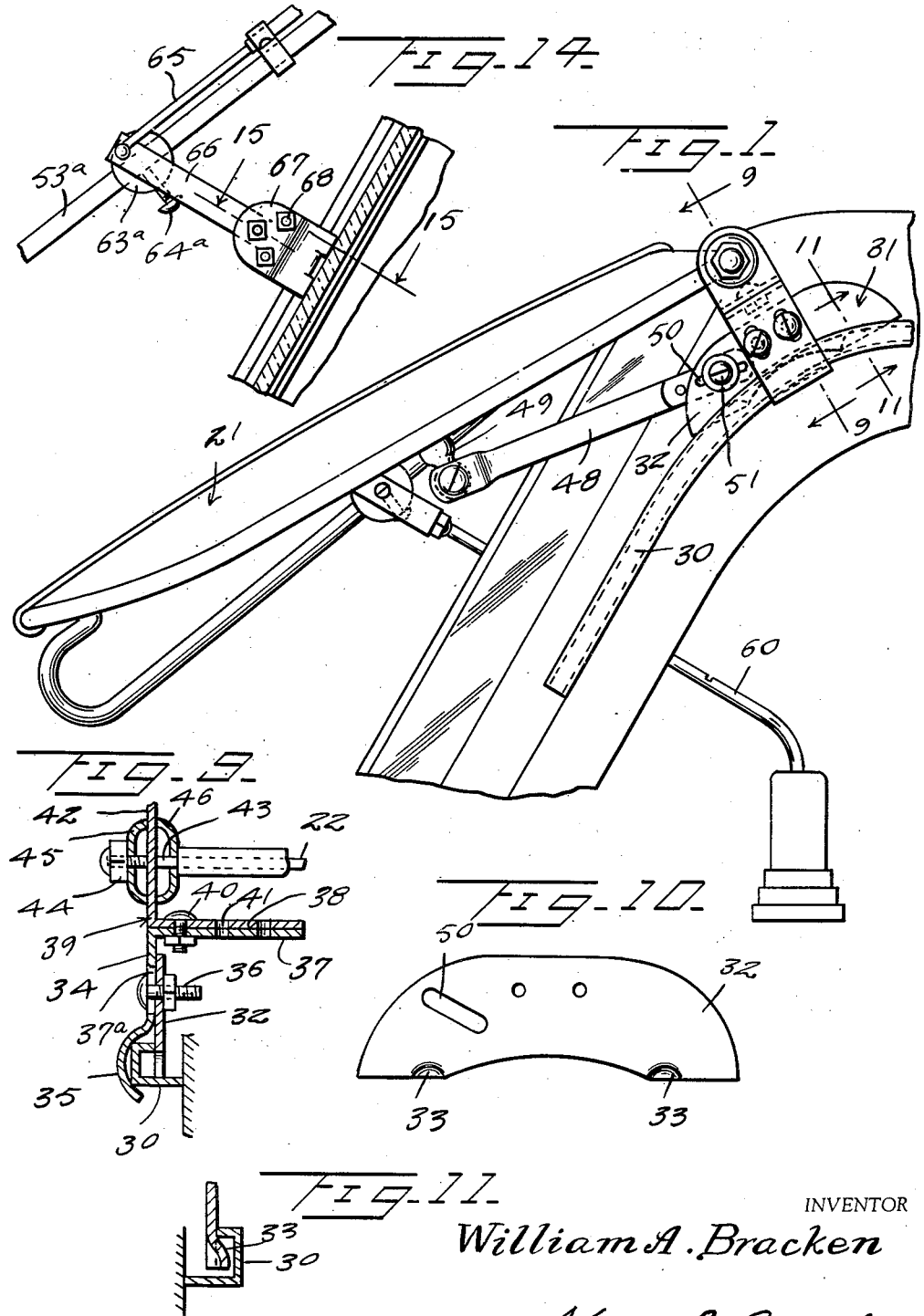

2,588,694

UNITED STATES PATENT OFFICE 2,588,694

SUN VISOR FOR AUTOMOBILES

William A. Bracken, Levy, Ark.

Application January 12, 1950, Serial No. 138,133

2 Claims. (Cl. 296—95)

This invention relates to visors for motor vehicles, and is an improvement over the visor embodied in my copending application, Ser. No. 791,884, filed December 15, 1947, for Automobile Windshield Sun Visor, now Patent No. 2,507,397, granted May 9, 1950.

An object of this invention is to provide a sun visor for vehicles which can be readily adjusted as to a selected angular position with respect to the windshield.

Another object of this invention is to provide a sun visor for vehicles and mounting means therefor so that one type of visor can be readily adapted to various types of windshields.

A further object of this invention is to provide an improved means of securing the visor parts together so as to simplify the assembly and at the same time provide a strong visor structure.

A further object of this invention is to provide an improved center brace which includes an improved gripping means to engage the central windshield bar.

With the above and other objects in view, my invention consists in the arrangement, combination and details of construction disclosed in the drawings and specification, and then more particularly pointed out in the appended claims.

In the drawings:

Figure 1 is a detailed end elevation of a center visor constructed according to an embodiment of this invention mounted on the windshield of a vehicle.

Figure 2 is a bottom plan view partly in section of the visor.

Figure 3 is a vertical section taken through the center of the visor.

Figure 4 is a fragmentary sectional view taken on the line 4—4 of Figure 2.

Figure 5 is a fragmentary sectional view taken on the line 5—5 of Figure 3.

Figure 6 is a bottom plan view of the connector between the two visor plates.

Figure 7 is a sectional view taken on the line 7—7 of Figure 6.

Figure 8 is an end elevation of the upper rear cushion means associated with this visor.

Figure 9 is a fragmentary sectional view taken on the line 9—9 of Figure 1.

Figure 10 is a detailed side elevation of one of the bracket clamping plates.

Figure 11 is a fragmentary sectional view taken on the line 11—11 of Figure 1.

Figure 12 is a fragmentary plan view of the central portion of the visor.

Figure 13 is a fragmentary exploded bottom plan of the central portion of the visor.

Figure 14 is a fragmentary side elevation of a modified form of adjusting means for the visor.

Figure 15 is a fragmentary sectional view taken on the line 15—15 of Figure 14.

Referring to the drawings, the numerals 20 and 21 designate generally a pair of elongated visor plates which are formed of sheet metal which is bent about a looped rod frame 22. The two visor plate members 20 and 21 are connected together at their inner ends by means of a substantially T-shaped connector 23 having the stem 24 thereof engaging between the adjacent inner ends of the visor members 20 and 21 and having the head or flanged portion 25 thereof engaging on the outer sides of the visor members 20 and 21. The forward end of the head or flange member 25 is bent in the form of a hook 26 which engages over the forward edges of the visor members 20 and 21, and the plates 20 and 21 are clamped to the T-shaped member 23 by means of an elongated clamping bar 27 as shown in Figure 4 which is secured to the coupling member 23 by a pair of fastening members 28.

The clamping bar 27 is a transversely arcuate configuration so that the longitudinal edges thereof will engage on the inner sides of the rolls or beads 29 formed by securing the looped rod 22 about the edges of the plate members 20 and 21.

The outer ends of the visor members 20 and 21 are secured to the gutters 30 of the vehicle by means of bracket members generally designated as 31. Each bracket member 31 comprises a plate 32 which is formed with a pair of detents 33 engaging within the gutter 30 as shown in Figure 11.

The plate 32 has adjustably secured thereto an outer plate member 34 formed with a curved clamping jaw 35 engageable about the outer side of the gutter 30 as shown in Figure 9. The two plates 32 and 34 are secured together by fastening means 36, and, preferably, the plate 34 is formed with elongated slots 37a so that the two plates 32 and 34 may be vertically adjusted to each other. The upper end of the plate 34 terminates in a right angularly disposed arm 37, and an arm 38 carried by an L-shaped member 39 is secured to the arm 37 by fastening means 40.

Preferably the two arms 37 and 38 are formed with spaced openings 41 so that the L-shaped member 39 may be horizontally adjusted on the arm 37. The vertical side 42 of the L-shaped member 39 has extending therethrough a stud 43 which forms a part of the looped frame 22, and the stud 43 is pivotally secured to the vertical side 42 by means of a nut 44. Preferably a pair of washers 45 and 46 of cup shape are disposed on opposite sides of the vertical bracket plate 42.

An elongated bracing bar 48 is secured between the clamping plate 32 and a stud 49 which is carried by the outer portion of the rod frame 22. Plate 32 is formed with an elongated slot 50 through which a fastening member 51 engages, and preferably a spring 52 is interposed between the head of the bolt or fastening member 51 and the outer side of the plate 32. The provision of the elongated slot 50 permits adjustment of bracing member 48 so that the visor plates 20 and 21 may be angularly adjusted to the desired degree.

In order to provide a means whereby the visor structure may be adjusted, I have provided an elongated guide bar 53 which is formed with a flattened rear or upper end 54 secured by the rearmost one of the fastening members 28, and the forward end of the guide 53 is provided with a return bend 55 terminating in a threaded stud 56 which is disposed substantially at right angles to guide bar 53.

The stud 56 is threaded into the stem 24 of the connector 23 as shown in Figure 3. A pair of rubber buttons 57 are carried by a supporting bar 58 which is interposed between the flattened rear end 54 of guide bar 53 and the clamping bar 27. The rubber buttons 57 may contact with the upper portion of the vehicle adjacent the upper edge of the windshield 59 so that no portion of the metal of which the visor is constructed will contact with the vehicle.

An elongated visor adjusting rod 60 is adjustably extended through a keeper 61 which is secured to the central bar of the windshield as set forth in greater detail in my copending application supra. The adjusting bar 61 is formed at its outer or forward end with a U-shaped yoke 62 secured to a slide member 63 which engages a guide 53. The slide member 63 may be fixed relative to the guide 53 by means of a set screw 64.

Referring now to Figures 14 and 15, there is disclosed a modified form of adjusting and bracing means for the visor. A guide bar 53a which is similar to the guide bar 53 has mounted thereon a slide 63a which may be secured in adjusted position on the guide 53a by means of a set screw 64a. The slide 63a has connected thereto one end of a Bowden wire 65 which may be extended to one side of the visor for adjustment of the angular position of the visor.

The slide 63a has secured thereto a bracing bar 66 which is secured between a pair of clamping plates 67 by fastening members 68. The clamping members 67 are formed with U-shaped inner end portions 69 for engagement beneath a portion of the dividing bar 70 which is normally disposed between the windshield members 59a. Each U-shaped member 69 includes a lug 71 engaging over the outer side of the divider 70 as shown in Figure 15.

In the use and operation of this visor structure the visor is secured at the opposite ends thereof to the gutter of the vehicle by means of the bracket members 31. If desired, the adjusting means 60 and 61 may be omitted and the visor secured in adjusted position by means of the adjustable bracing members 48.

With a visor structure as hereinbefore described including the improved bracket means at the opposite ends of the visor, a visor may be secured to substantially any type of vehicle, and any slight differences in the width of the vehicle can be compensated for by means of the adjustable brackets 31.

What is claimed is:

1. A sun visor for mounting on the forward side of the windshield of a vehicle and attachment to the gutters, said visor comprising a pair of elongated visor plates, means securing the inner ends of the plates together, a threaded stud projecting outwardly from the outer end of each plate adjacent the rear edge thereof, a bracket means engaging each stud and the gutter, said bracket means comprising inner and outer gutter clamping plates, means securing said plates together in clamping position, an inwardly projecting extension carried by one of said plates, an angle member having one side thereof overlying said extension and the other side projecting forwardly and formed with an opening, means securing said extension and said one side of said angle member together, a nut on each stud holding the stud in said opening, and a brace connected between the other of said clamping plates and the adjacent end of one of said visor plates, said other clamping plate having an elongated opening through which the securing means for said brace engages whereby said visor plates may be angularly adjusted with respect to the windshield.

2. A sun visor for mounting on the forward side of the windshield of a vehicle and attachment to the gutters, said visor comprising a pair of elongated visor plates, means securing the inner ends of the plates together, a cushion means at the inner ends of said plates adjacent the rear thereof, a threaded stud projecting outwardly from the outer end of each plate adjacent the rear edge thereof, a bracket means engaging each stud and the gutter, said bracket means comprising inner and outer gutter clamping plates, means securing said plates together in clamping position, an inwardly projecting extension carried by one of said plates, an angle member having one side thereof overlying said extension and the other side projecting forwardly and formed with an opening, means securing said extension and said one side of said angle member together, a nut on each stud holding the stud in said opening, and a brace connected between the other of said clamping plates and the adjacent end of one of said visor plates, said other clamping plate having an elongated opening through which the securing means for said brace engages whereby said visor plates may be angularly adjusted with respect to the windshield.

WILLIAM A. BRACKEN.

REFERENCES CITED

The following references are of record in the file of this patent:

UNITED STATES PATENTS

| Number | Name | Date |
| --- | --- | --- |
| 2,334,856 | Atkinson | Nov. 23, 1943 |
| 2,500,406 | Greenfield | Dec. 20, 1946 |

FOREIGN PATENTS

| Number | Country | Date |
| --- | --- | --- |
| 584,421 | Great Britain | Jan. 14, 1947 |